United States Patent
Chen

(10) Patent No.: US 10,247,595 B2
(45) Date of Patent: Apr. 2, 2019

(54) SOAP DISPENSING DEVICE HAVING SOAP REPLENISHING NOTIFICATION FUNCTION

(71) Applicant: HOKWANG INDUSTRIES CO., LTD., New Taipei (TW)

(72) Inventor: Kuan-Jen Chen, New Taipei (TW)

(73) Assignee: Hokwang Industries Co., Ltd., New Taipei (TW)

( * ) Notice: Subject to any disclaimer, the term of this patent is extended or adjusted under 35 U.S.C. 154(b) by 0 days.

(21) Appl. No.: 15/692,432

(22) Filed: Aug. 31, 2017

(65) Prior Publication Data

US 2019/0063977 A1 Feb. 28, 2019

(51) Int. Cl.
*A47K 5/12* (2006.01)
*G01F 23/00* (2006.01)
*B67D 1/12* (2006.01)
*B65D 25/56* (2006.01)

(52) U.S. Cl.
CPC ........ *G01F 23/0007* (2013.01); *A47K 5/1217* (2013.01); *A47K 5/12* (2013.01); *A47K 2005/1218* (2013.01); *B65D 25/56* (2013.01); *B65D 2203/04* (2013.01); *B67D 2001/1263* (2013.01); *B67D 2210/00157* (2013.01)

(58) Field of Classification Search
CPC ............... B65D 25/56; B65D 2203/04; B67D 2001/1263; B67D 2210/00157; G01F 23/007; G01F 23/0007; A47K 5/12; A47K 2005/1218; A47K 5/1217
See application file for complete search history.

(56) References Cited

U.S. PATENT DOCUMENTS

| 5,255,822 A * | 10/1993 | Mease ................. A47K 5/1202 222/113 |
| 5,791,525 A | 8/1998 | Fan |
| 7,527,174 B2 | 5/2009 | Meehan et al. |
| 8,579,157 B2 | 11/2013 | Bem et al. |
| 8,668,118 B2 * | 3/2014 | Tsai ........................ B67D 7/62 222/180 |
| 9,681,780 B2 | 6/2017 | Ciavarella et al. |

(Continued)

FOREIGN PATENT DOCUMENTS

| TW | M374830 U | 3/2010 |
| TW | I450700 B | 9/2014 |

*Primary Examiner* — Frederick C Nicolas
(74) *Attorney, Agent, or Firm* — Muncy, Geissler, Olds & Lowe, P.C.

(57) ABSTRACT

A soap dispensing device having a soap replenishing notification function comprises a liquid soap container, a soap dispensing body, a soap dispenser connected with the liquid soap container and a control box. The liquid soap container is internally provided with a liquid level detection unit capable of emitting a liquid soap replenishing signal. The soap dispensing body is provided on a countertop and connected with the liquid soap container, and has a liquid soap replenishing light display area, an induction area capable of emitting an induction signal and a soap dispensing head. The control box is used for receiving the liquid soap replenishing signal and the induction signal, wherein the liquid soap replenishing light display area is formed on the soap dispensing body according to the liquid soap replenishing signal, and a liquid soap is supplied by the soap dispensing head according to the induction signal.

11 Claims, 8 Drawing Sheets

(56) References Cited

U.S. PATENT DOCUMENTS

| | | | |
|---|---|---|---|
| 9,706,883 B2 * | 7/2017 | Shakkour | A47K 5/1215 |
| 2017/0112329 A1 | 4/2017 | Babikian | |
| 2017/0190565 A1 | 7/2017 | Proper et al. | |
| 2018/0199765 A1 * | 7/2018 | Wegelin | A47K 5/1217 |

* cited by examiner

SOAP DISPENSING DEVICE HAVING SOAP REPLENISHING NOTIFICATION FUNCTION

FIELD OF THE INVENTION

The present invention relates to a soap dispensing device having a soap replenishing notification function, and more particularly to a soap dispensing device which can emit a soap replenishing notification or a notification that a liquid soap has been filled according to a liquid level state of the liquid soap using light display.

BACKGROUND OF THE INVENTION

The known soap dispenser, such as in U.S. Pat. No. 5,791,525, comprises a rear cover plate, a liquid soap container for containing a liquid soap, and a front cover plate, wherein a soap discharging portion which is communicated with and coupled to the liquid soap container is provided at the lower end of the liquid soap container, and the front cover plate covers the rear cover plate and allows the container to be contained inside. The rear cover plate is provided with a first clamping portion for clamping an opening side of the container and a second clamping portion for clamping the soap discharging portion. When a maintainer wants to replenish the liquid soap to the liquid soap container, it is only necessary to take the first clamping portion and the second clamping portion down, such that the liquid soap can be replenished to the liquid soap container. Although this soap dispenser is convenient for the maintainer to dismantle the liquid soap container, it is still necessary to dismantle the front cover plate to replenish the liquid soap to the liquid soap container contained therein when the liquid soap is replenished to the liquid soap container. On the other hand, the structure in which the liquid soap container is fixed using the first clamping portion and the second clamping portion is not stable and prone to causing the deformation at a joint between the first and second clamping portions and the rear cover plate after multiple pulling-out, thereby leading unserviceability due to structure damage.

To support the arrangement of an automatic dispenser, the Republic of China Patent Publication No. M374830 discloses an automatic soap dispenser structure, which comprises a liquid soap container for containing a liquid soap, a pressure pump provided at an opening of the liquid soap container and used for sucking the liquid soap, a driving module which leans against the pressure pump and impels the pressure pump to suck the liquid soap outwards, a liquid soap pipeline which is connected to the pressure pump and conveys the liquid soap downwards, and a housing body for containing the above elements. The automatic soap dispenser structure may be arranged in junction with a soap dispensing faucet. When a user puts his/her hands below the faucet, an inductor provided on the faucet will transfer a starting signal to the soap dispenser, such that the liquid soap is discharged to the soap dispensing faucet from the liquid soap container, to further clean the user's hands. However, when the liquid soap is replaced in such structure, it is necessary to unscrew the pressure pump from threads on the liquid soap container, such that the liquid soap container is taken out and filled with the liquid soap, wherein particularly the structure in which the liquid soap container is fixed by threads on the pressure pump is most troublesome. Due to the suspended design of the liquid soap container, the liquid soap container is not easily unscrewed and separated from the pressure pump owing to the weight of the liquid soap container when the liquid soap container is replaced. In addition, the liquid soap container easily drops to the ground because of carelessness to cause the awkward situation that the ground is sprinkled with the liquid soap.

For another example, the Republic of China Patent Publication No. I450700 is the patent application previously filed by the applicant of this case and discloses a replenishable liquid soap dispensing device comprising a liquid soap container, a soap dispenser and a support rack. The liquid soap container comprises a holding portion, a bottle opening on the holding portion and at least one leaning portion on the holding portion. The soap dispensing device comprises a soap intake pipeline connected to the liquid soap container to suck a liquid soap, a soap discharge pipeline communicated with the soap intake pipeline to discharge the liquid soap and a pressurizing means to increase the pressure in the soap intake pipeline and the soap discharge pipeline to further deliver the liquid soap from the soap intake pipeline towards the soap discharge pipeline. The support rack comprises a first support portion to hold the soap dispensing device and a second support portion corresponding to and coupling with the leaning portion of the liquid soap container to hold the liquid soap container. The liquid soap container can be pulled out from the track portion easily, such that the procedure of replacing the liquid soap becomes more simple and convenient.

However, with respect to these above-mentioned devices, the liquid soap is replenished by taking the liquid soap container out, and these liquid soap containers are generally hidden under a countertop. Therefore, in case of performing a soap replenishing operation, it is necessary to take the liquid soap container from the lower portion of the countertop within a finite space and then remount the liquid soap container to the rack after the liquid soap is filled, and the operator easily encounters the awkward situation that the liquid soap container drops to the ground because of carelessness and the ground is sprinkled with the liquid soap.

Therefore, to simplify the procedure of replacing the liquid soap, a soap dispensing device is further developed, such as in U.S. Pat. Nos. 7,527,174, 8,579,157, 9,681,780 and US Publication Nos. 2017112329, 2017190565, and the like, all of which disclose soap dispensing devices. However, in addition to having a relatively complicated structure generally, these soap dispensing devices are easier to cause the overflow problem of the liquid soap container when the liquid soap is excessively replenished, resulting in a mess of the surrounding environment of the liquid soap container.

SUMMARY OF THE INVENTION

For this purpose, a main objective of the present invention is to provide a soap dispensing device which has a soap replenishing notification function and can perform a soap filling operation directly on a countertop.

According to said objective, the present invention provides a soap dispensing device having a soap replenishing notification function. The soap dispensing device is provided on a countertop to supply a liquid soap automatically and comprises a liquid soap container for containing the liquid soap, a soap dispensing body, a soap dispenser and a control box. The liquid soap container is internally provided with a liquid level detection unit for detecting a liquid level state of the liquid soap and emitting a liquid soap replenishing signal. The soap dispensing body comprises an outer shell, a soap filling pipe, a cover plate, at least one light emitting assembly, an induction area and a soap dispensing head. The outer shell is provided on the countertop. The soap filling pipe is provided inside the outer shell and communicated to the liquid soap container. The cover plate covers and encloses the soap filling pipe. The light emitting assembly is provided inside the outer shell and capable of emitting light to form a liquid soap replenishing light display area on the outer shell. The induction area is provided with an inductor and emits an induction signal. The soap dispensing head is connected to the outer shell. A light-transmitting neck portion which is annularly provided on the cover plate is provided at a position, close to the cover plate, of the soap filling pipe. The light-transmitting neck portion is partially exposed to the outer shell, such that light emitted from the liquid emitting assembly forms the liquid soap replenishing light display area through the light-transmitting neck portion. The soap dispensing head is provided with a soap outlet for supplying the liquid soap and a gas outlet connected to the liquid soap container using an exhaust pipe. The soap dispenser is connected to the liquid soap container and comprises a soap discharge pipeline which is connected to the soap outlet to convey the liquid soap contained in the liquid soap container to the soap outlet. The control box is electrically connected to the liquid level detection unit, the inductor, the light emitting assembly and the valve seat respectively to receive the liquid soap replenishing signal and the induction signal emitted in the liquid level state, and impels the light emitting assembly to emit light according to the liquid soap replenishing signal to form the liquid soap replenishing light display area on the soap dispensing body, and controls the soap dispenser according to the induction signal such that the liquid soap is provided from the liquid soap container using the soap discharge pipeline to the soap outlet and is dispensed.

In one embodiment, the cover plate further comprises a lock thereon, which can be locked using a key to prevent the soap filling pipe from being opened.

In one embodiment, the liquid soap container further comprises a connection portion through which the soap filling pipe and the exhaust pipe are connected with the liquid soap container.

In one embodiment, the control box is further provided above the liquid soap container, and the connection portion and the soap dispenser are provided at the same side of the liquid soap container. In one embodiment, the control box is further provided below the liquid soap container, and the connection portion and the soap dispenser are provided at corresponding sides of the liquid soap container.

In one example, the outer shell of the soap dispensing body further comprises a fixed neck portion which is provided on the countertop.

In one embodiment, the soap dispensing body further comprises a locking member which is opposite to and spaced from the fixed neck portion, such that the soap dispensing body is fixed on the countertop using the fixed neck portion and the locking member.

In one embodiment, the locking member is further sleeved outside the soap filling pipe.

In one embodiment, the soap filling pipe is further formed from a light-transmissible material.

In one embodiment, the control box further comprises a control unit for connecting the liquid level detection unit, and a communication unit which is linked to the control unit and is capable of transmitting signals with an external electronic device.

In one embodiment, the liquid level detection unit further comprises an upper liquid level detection unit for detecting an upper liquid level of the liquid soap in the liquid soap container and a lower liquid level detection unit for detecting a lower liquid level of the liquid soap in the liquid soap container.

Through the above technical solutions, compared with the prior art, the present invention can effectively achieve the following beneficial effects substantially:

1. Compared with the known technology, the liquid level state of the liquid soap can be distinguished by the liquid soap replenishing light display area to judge whether to fill the soap or the soap has been filled.

2. In addition to discharging gas in the liquid soap container, the gas outlet can allow the excessive liquid soap to be discharged via the gas outlet when the excessive liquid soap is filled to the liquid soap container, thereby avoiding the liquid soap from overflowing from the periphery of the liquid soap container.

3. The structure of the present invention is simpler than the known technology, and can greatly reduce the material cost and the assembly cost.

DETAILED DESCRIPTION OF THE PREFERRED EMBODIMENTS

Figure 1:
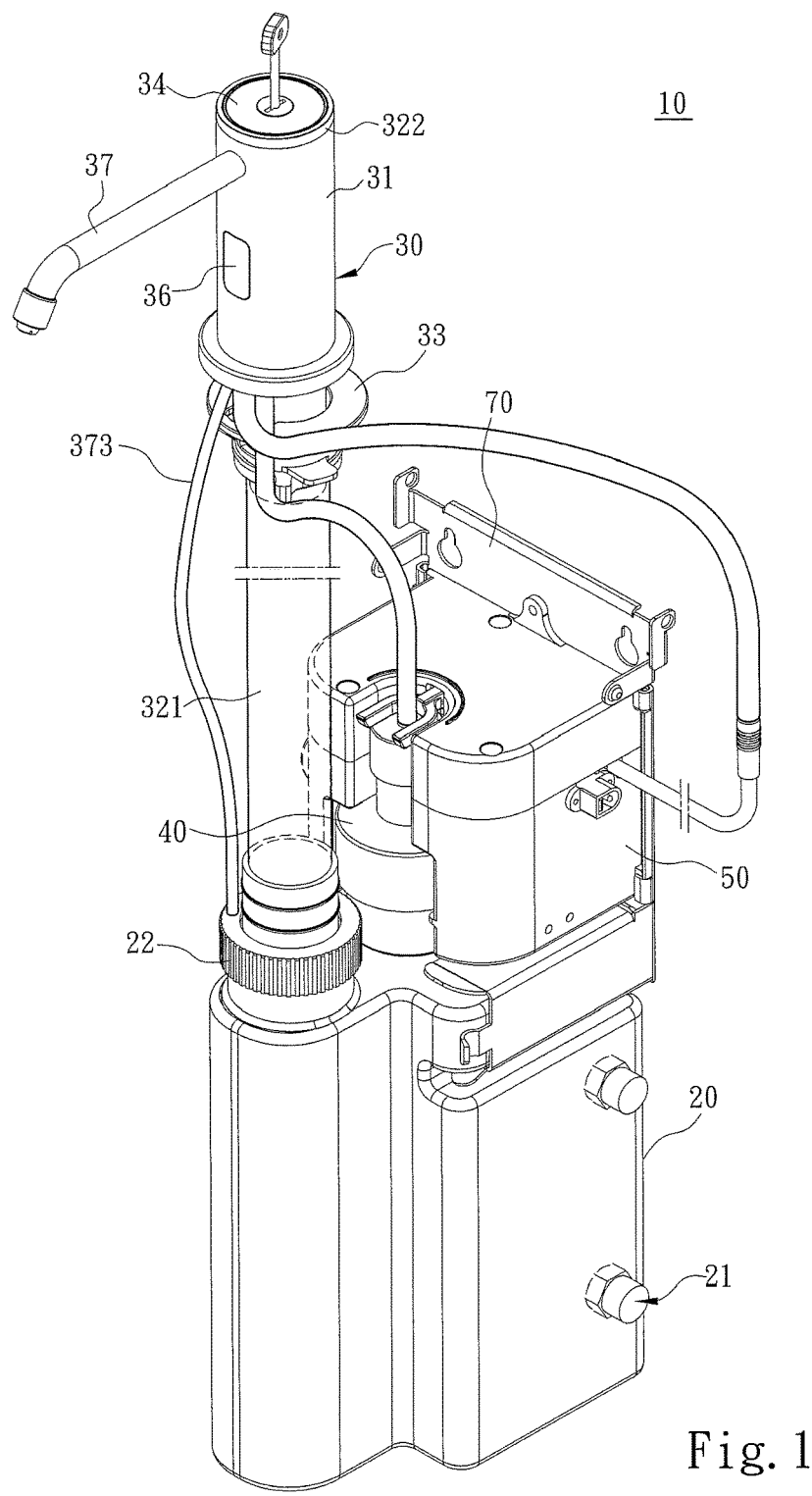
FIG. 1 is a schematic stereograph of the present invention.
Figure 2:
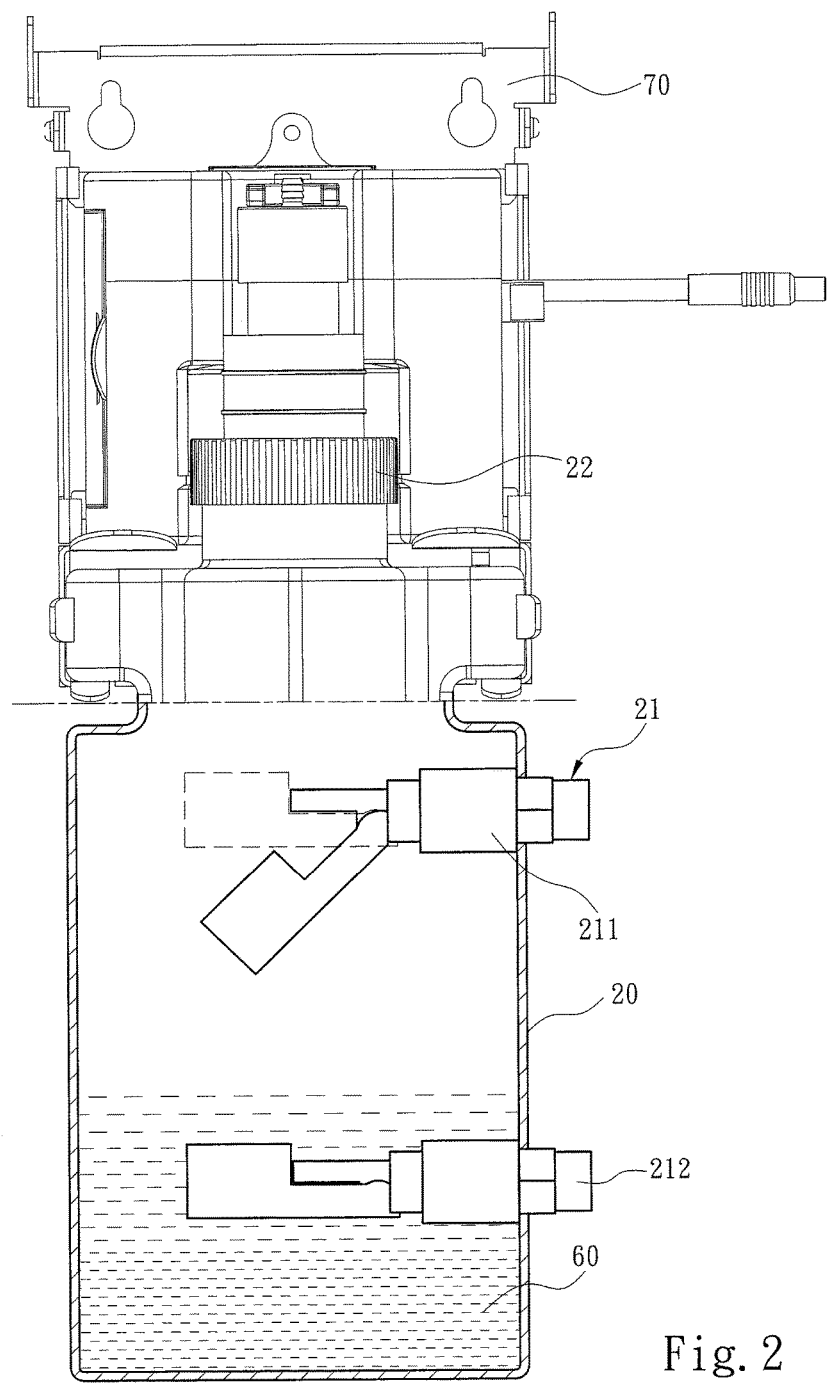
FIG. 2 is a sectional schematic drawing of a liquid soap container of the present invention.

The detailed description and technical content of the present invention will now be described with reference to the accompanying drawings:

Referring to FIG. 1 to FIG. 2, as shown clearly in the drawings, a soap dispensing device 10 having a soap replenishing notification function provided by the present invention is disposed on a countertop to automatically dispense a liquid soap 60 and comprises a liquid soap container 20, a soap dispensing body 30, a soap dispenser 40 and a control box 50.

Figure 3:
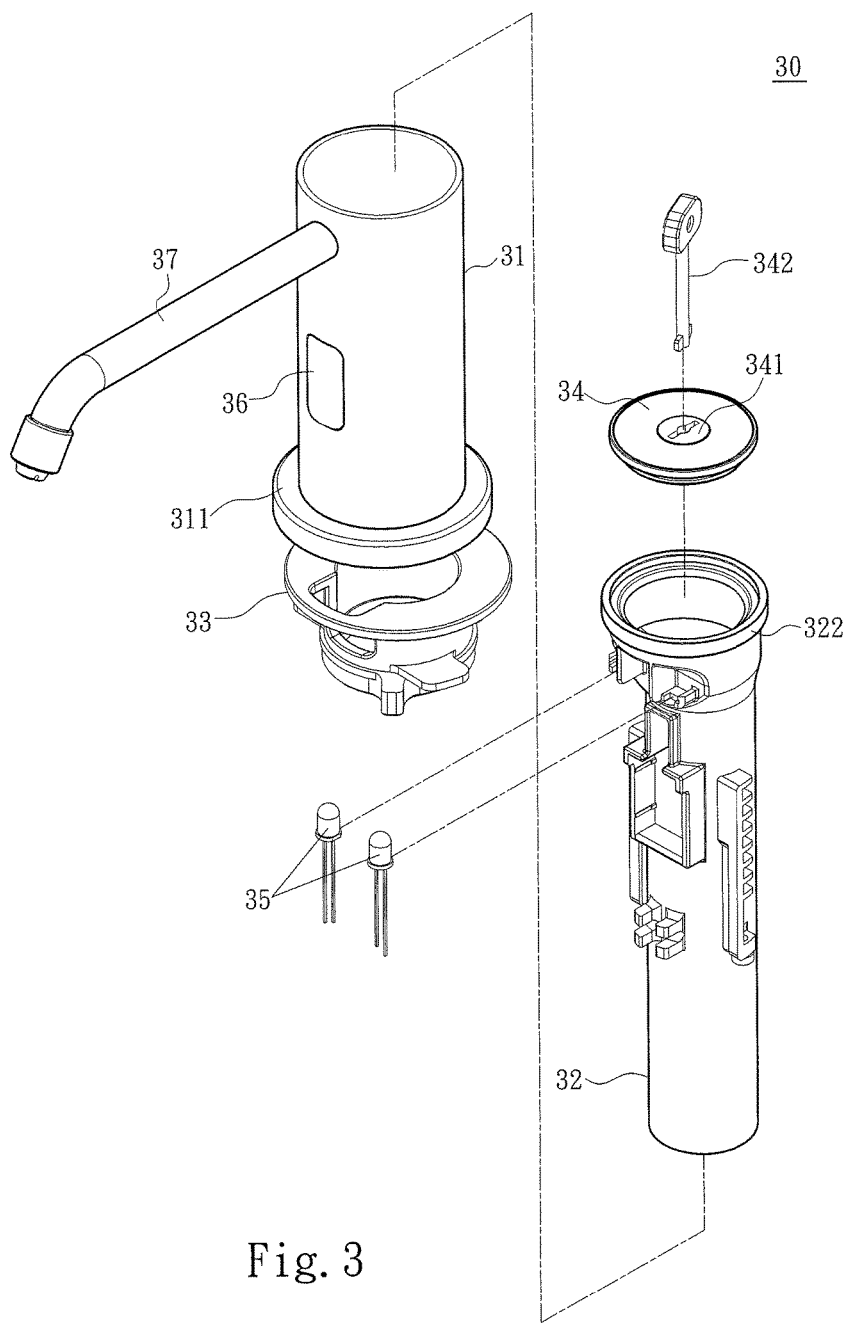
FIG. 3 is an exploded schematic drawing of a soap dispensing body of the present invention.

Also referring to FIG. 3, the liquid soap container 20 is used for containing the liquid soap 60 and is internally provided with a liquid level detection unit 21 which is used for detecting a liquid level state of the liquid soap 60 and emitting a liquid soap replenishing signal. In the present embodiment, the liquid soap container 20 is further provided with an upper liquid level detection unit 211 and a lower liquid level detection unit 212. The upper liquid level detection unit 211 is used for detecting an upper liquid level of the liquid soap 60 and emitting a liquid soap filling completion signal when the liquid soap 60 reaches the upper liquid level. The lower liquid level detection unit 212 is used for detecting a lower liquid level of the liquid soap 60 and emitting a liquid soap replenishing signal when the liquid soap 60 reaches the lower liquid level. In addition, the liquid soap container 20 is further provided with a connection portion 22 connected to the soap dispensing body 30.

Figure 4:
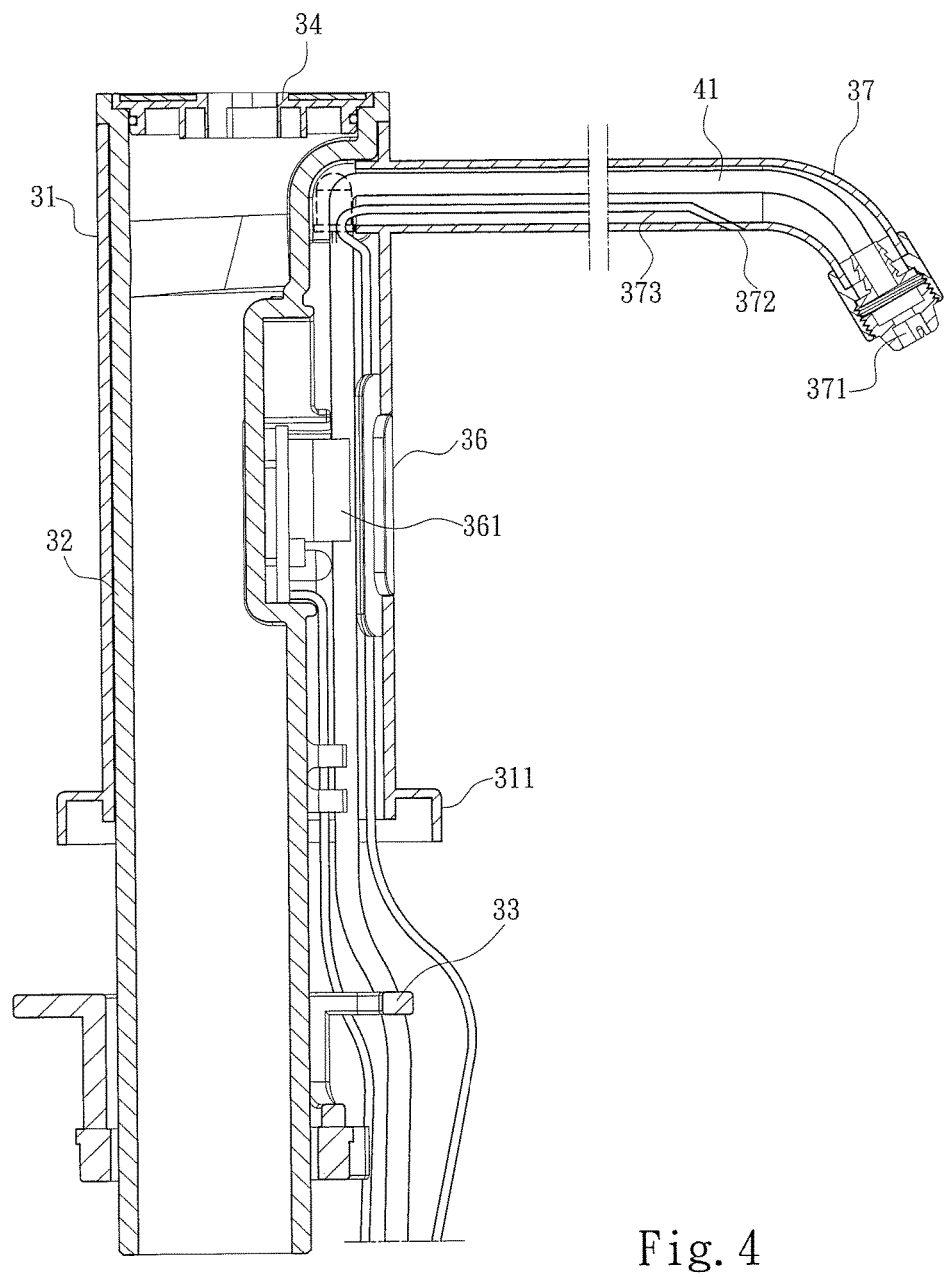
FIG. 4 is a sectional schematic drawing of the soap dispensing body of the present invention from a first visual angle.
Figure 5:
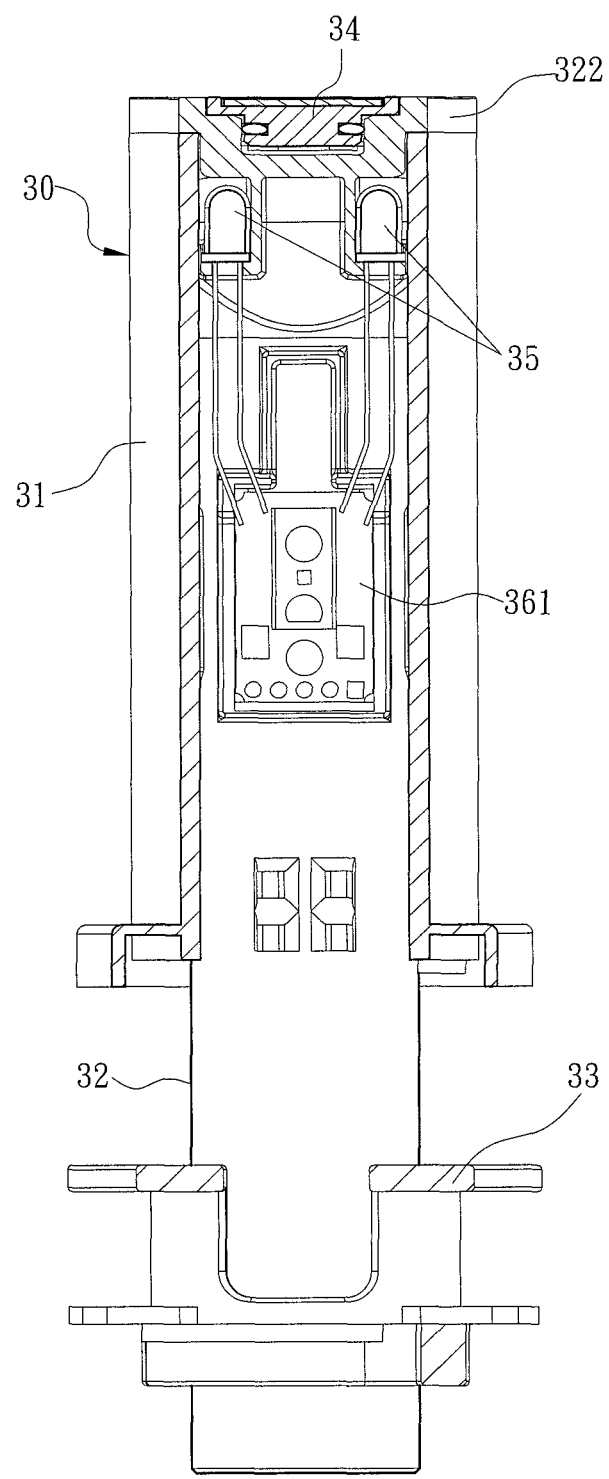
FIG. 5 is a sectional schematic drawing of the soap dispensing body of the present invention from a second visual angle.
Figure 8:
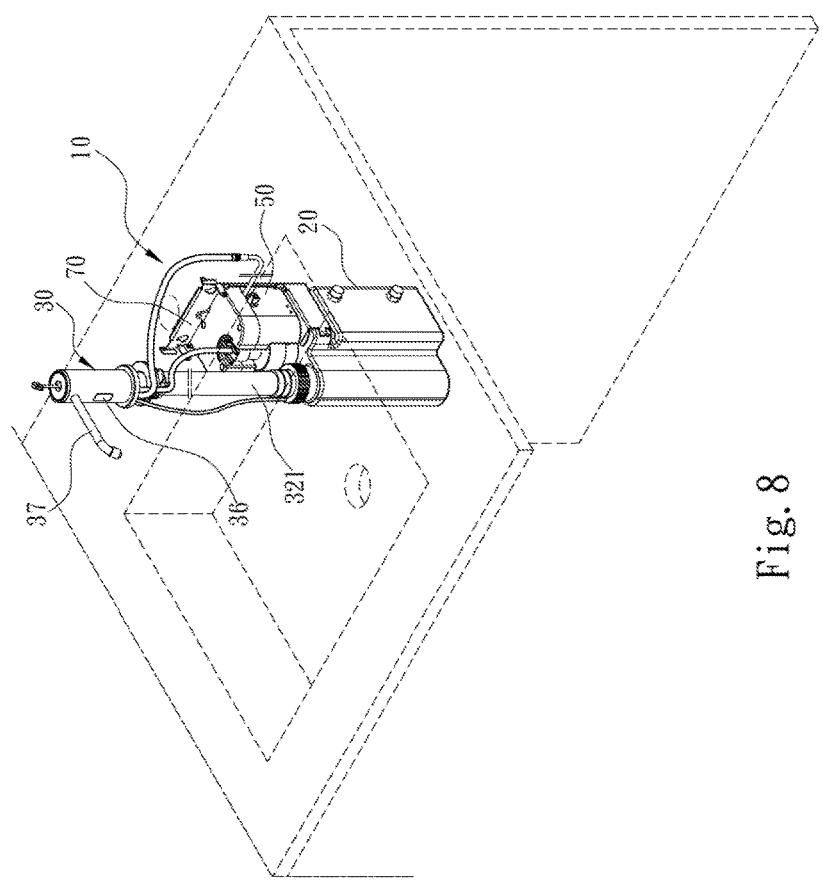
FIG. 8 is an implementation diagram of a soap dispensing device of the present invention.

Also referring to FIG. 3, FIG. 4, FIG. 5 at the same time, the soap dispensing body 30 is provided on a countertop (which belongs to a known technology and will not be repeated again as shown in FIG. 8) and comprises an outer shell 31, a soap filling pipe 32, a locking member 33, a cover plate 34, at least one light emitting assembly 35, an induction area 36 and a soap dispensing head 37. The outer shell 31 is provided on the countertop. The soap filling pipe 32 is provided inside the outer shell 31 and communicated to the liquid soap container 20. The locking member 33 is used for fixing the outer shell 31 to the countertop. The cover plate 34 covers and encloses the soap filling pipe 32. The light emitting assembly 35 is provided inside the outer shell 31 and can emit light to form a liquid soap replenishing light display area (described later) on the outer shell 31. The induction area 36 is provided with an inductor 361 and emits an induction signal. The soap dispensing head 37 is connected to the outer shell 31. In the present embodiment, the outer shell 31 is a hollow pipe body, and a fixed neck portion 311 is provided at the bottom of the outer shell 31 and used for arranging the outer shell 31 on the countertop. The soap filling pipe 32 is formed from a hollow tubular body made of a light-transmissible material and is connected to the connection portion 22 of the liquid soap container 20 using a soap filling pipeline 321 (as shown in FIG. 1). A light-transmitting neck portion 322 is further formed above the soap filling pipe 32 and strides over the outer shell 31. The soap filling pipe 32 further extends through the fixed neck portion 311 of the outer shell 31 and passes through the countertop. The locking member 33 is located under the countertop and sleeved outside the soap filling pipe 32 and is opposite to and spaced from the fixed neck portion 311 of the outer shell 31, such that the locking member 33 and the fixed neck portion 311 are clamped to the upper side and the lower side of the countertop respectively, and the soap dispensing body 30 is fixed on the countertop. The cover plate 34 further covers the center of the light-transmitting neck portion 322 of the soap filling pipe 32, such that the light-transmitting neck portion 322 is annularly provided on the edge of the cover plate 34, and a lock 341 is further provided on the cover plate 34, such that the lock 341 is used to prevent the cover plate 34 from being easily opened on the soap dispensing body 30. The lock 341 is further provided with a key 342 for an operator to open the lock 341 using the key 342, and the cover plate 34 is taken down from the soap filling pipe 32. The light emitting assembly 35 is provided between the outer shell 31 and the soap filling pipe 32, and located below the light-transmitting neck portion 322, such that light emitted from the light emitting assembly 35 is transmitted outwards via the light-transmitting neck portion 322 to form the liquid soap replenishing light display area. The induction area 36 is provided on the outer shell 31, and the inductor 361 is provided at a position, opposite to the induction area 36, of the soap filling pipe 32, such that the inductor 361 can induce whether hands of a user approach to the soap dispensing body 30 via the induction area 36. The soap dispensing head 37 is provided with at least one soap outlet 371 for dispensing the liquid soap 60 and a gas outlet connected to the liquid soap container 20 using an exhaust pipe 373.

The soap dispenser 40 is connected to the liquid soap container 20 and comprises a soap discharging pipeline 41 which is connected to the soap outlet 371 to deliver the liquid soap 60 contained in the liquid soap container 20 to the soap outlet 371.

The control box 50 is electrically connected to the liquid level detection unit 21, the inductor 361, the light emitting assembly 35 and the soap dispenser 40 to receive the liquid soap replenishing signal emitted by the liquid level detection unit 21 to detect the liquid level state of the liquid soap 60 and the induction signal emitted from the inductor 361.

Referring to FIG. 1, FIG. 2, FIG. 3, FIG. 4, FIG. 5 after the soap dispensing device 10 is mounted on the countertop, whether the hands of the human body approach to the soap dispensing body 30 is induced mainly by the induction area 36 on the soap dispensing body 30. After the hands of the human body approach to the soap dispensing body 30, the inductor 361 can emit an induction signal while sensing the handles of the human body. After receiving the induction signal, the control box 50 can drive the soap dispenser 40 immediately, such that the liquid soap 60 in the liquid soap container 20 is discharged from the soap outlet 371 of the soap dispensing head 37 using the soap dispenser 40 via the soap discharge pipeline 4, so as to dispense the liquid soap 60 to the hands of the human body to further achieve an automatic soap dispensing effect.

However, when the liquid level of the liquid soap 60 in the liquid soap container 20 gradually drops to the position of the lower liquid level detection unit 212 and the lower liquid level detection unit 212 cannot induce the liquid soap 60, the lower liquid level detection unit 212 can produce a liquid soap replenishing signal and transmit the liquid soap replenishing signal to the control box 50. After receiving the liquid soap replenishing signal, the control box 50 can drive the light emitting assembly 35, such that the light emitting assembly 35 emits light, and the light passes through the light-transmitting neck portion 322. The liquid soap replenishing light display area is formed on the soap dispensing body 30, such that the case that the liquid level of the liquid soap 60 in the liquid soap container 20 has reached the lower liquid level and a soap replenishing operation is notified to the user through the display effect of the liquid soap replenishing light display area.

When the operator wants to perform the soap replenishing operation, the lock 341 is opened using the key 342 first, such that the cover plate 34 is taken down from the soap dispensing body 30. Next, the liquid soap 60 is directly poured to the soap filling pipe 32, such that the liquid soap 60 enters the liquid soap container 20 through the soap filling pipe 32 via the soap filling pipeline 321. It is worth mentioning that when the liquid soap 60 is filled by the soap filling pipe 32, a gas can enter the liquid soap container 20 in a process of pouring the liquid soap 60, and the gas at this moment will flow through the exhaust pipe 373 and is exhausted from the gas outlet 372 of the soap dispensing head 37, such that the gas can be prevented from residing in the liquid soap container 20 to further quicken the speed of the liquid soap 60 to flow to the liquid soap container 20, and therefore the efficiency of the soap replenishing operation is enhanced.

Furthermore, when the liquid level of the liquid soap 60 in the liquid soap container 20 reaches the upper liquid level detection unit 211, the upper liquid level detection unit 211 can emit the liquid soap filling completion signal. After receiving the liquid soap filling completion signal, the control box 50 can drive the light emitting assembly 35 to generate light, and the light is projected outwards via the light-transmitting neck portion 322 to form the liquid soap replenishing light display area on the soap dispensing body 30, such that the operator who performs the soap replenishing operation can identify and stop the soap replenishing operation. Then, the cover plate 34 covers the soap dispensing body 30 and is locked, such that the soap replenishing operation can be completed. Furthermore, in the soap replenishing operation, when the operator pours excessive liquid soap 60 because of carelessness, an overflow phenomenon of the liquid soap 60 can be generated in the liquid soap container 20 because the gas outlet 372 is connected to the liquid soap container 20 using the exhaust pipe 373, such that the excessive liquid soap 60 can be discharged by the exhaust pipe 373 via the gas outlet 372. Therefore, the excessive liquid soap 60 is prevented from flowing out of the liquid soap container 20 to avoid a mass of the surrounding environment of the liquid soap container 20.

It is worth mentioning that the light emitting assembly 35 further can emit different lights, for example, after receiving the liquid soap replenishing signal emitted from the lower liquid level detection unit 212, the control box 50 can drive the light emitting assembly 35 to emit red light, such that the red light passes through the light-transmitting neck portion 322 and forms the liquid soap replenishing light display area of the red light on the soap dispensing body 30. After the soap filling operation is completed, the control box 50 can receive the liquid soap filling completion signal emitted from the upper liquid level detection unit 211 and drive the light emitting assembly 35 to emit green light, such that the green light passes through the light-transmitting neck portion 322 and forms the liquid soap replenishing light display area of the green light on the soap dispensing body 30.

Figure 6:
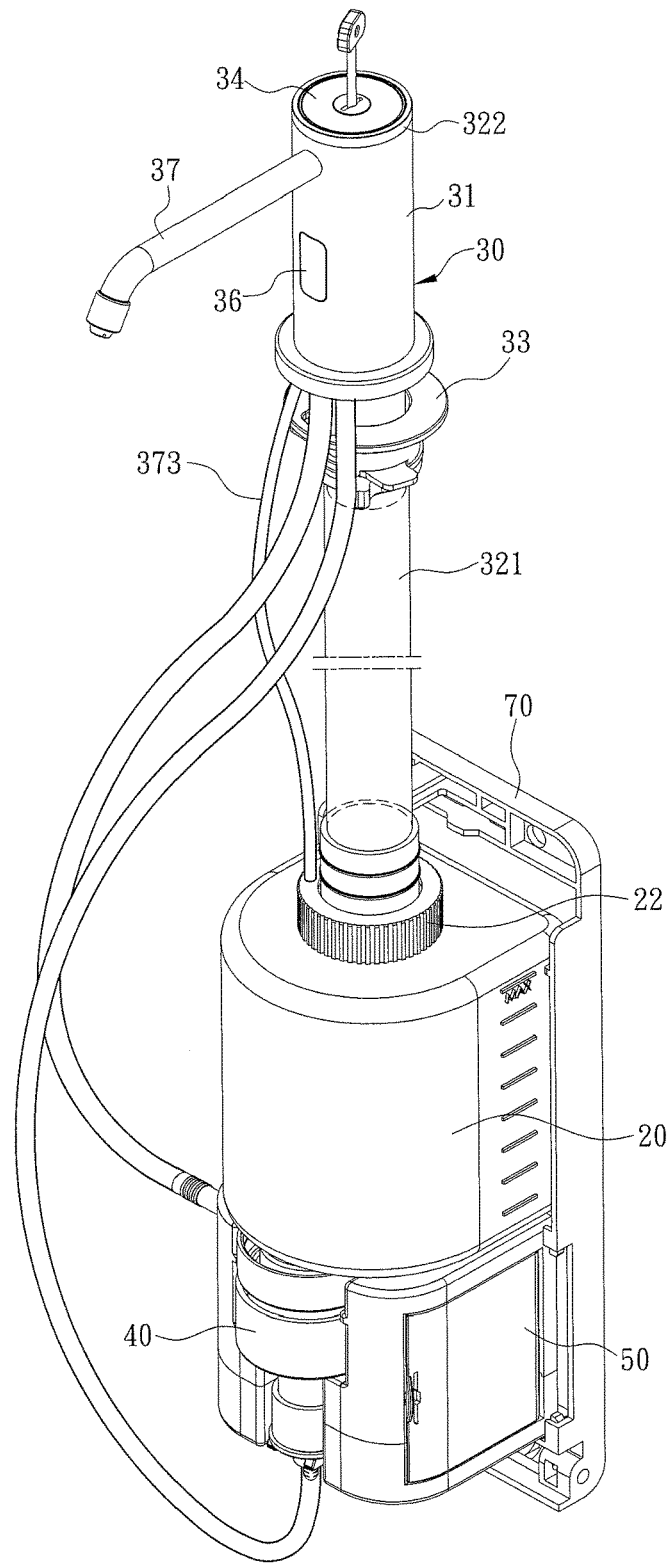
FIG. 6 is a schematic stereograph of another embodiment of the present invention.

Also as shown in FIG. 1, the present invention further comprises a support rack 70 which is used for fixing the liquid soap container 20 and the control box 50 under the countertop. In the present embodiment, the control box 50 is provided above the liquid soap container 20 and is fixed by the support rack 70, and the connection portion 22 of the liquid soap container 20 and the soap dispenser 40 are provided at the same side of the liquid soap container 20. Also as shown in FIG. 6, in the present embodiment, the control box 50 is provided below the liquid soap container 20 and is fixed by the support rack 70, and the connection portion 22 of the liquid soap container 20 and the soap dispenser 40 are provided at the corresponding sides of the liquid soap container 20 respectively.

Figure 7:
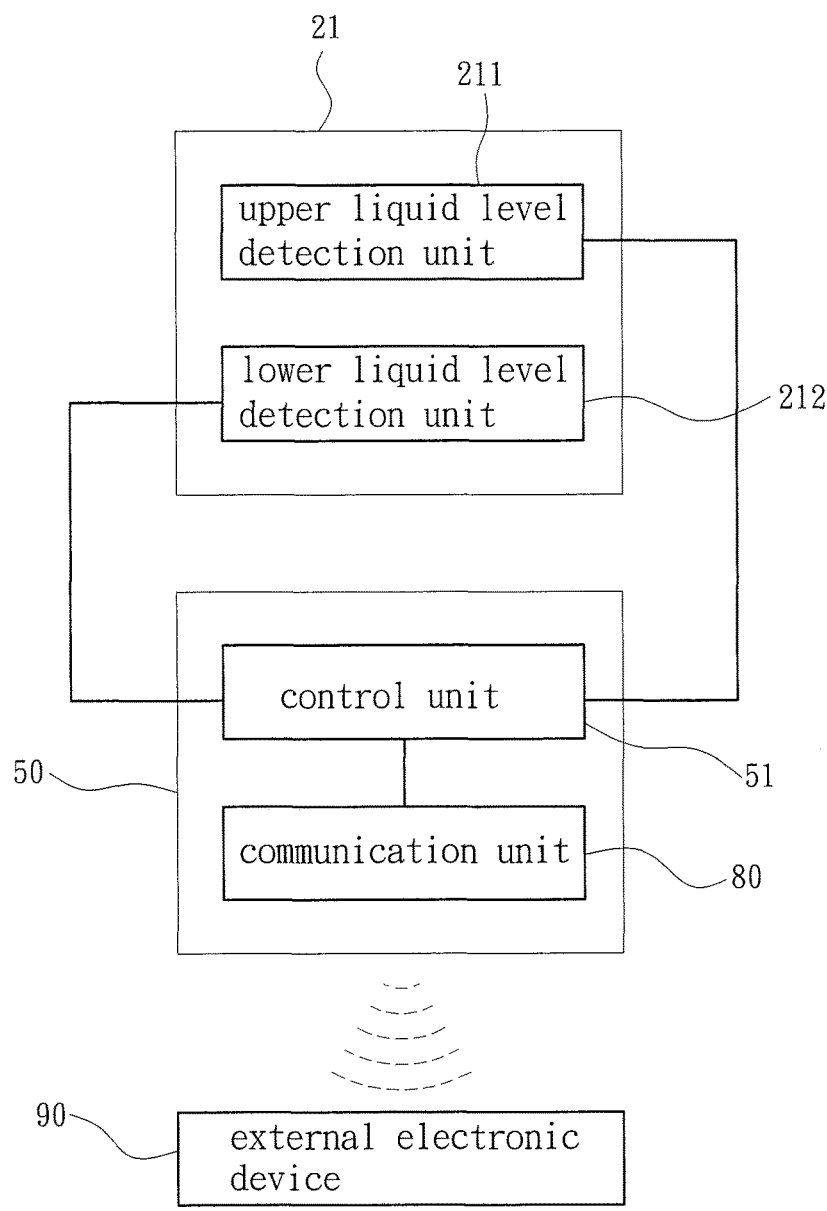
FIG. 7 is a schematic circuit block diagram of another embodiment of the present invention.

Finally, as shown in FIG. 7, the liquid soap replenishing signal may be further transmitted to an external electronic device 90 using a communication unit 80, such that the operator can obtain the liquid soap replenishing signal immediately using the external electronic device 90. A control unit 51 is provided inside the control box 50. The control unit 51 is connected to the upper liquid level detection unit 211 and the lower liquid level detection unit 212 respectively, and the control unit 51 is linked to the communication unit 80. The communication unit 80 and the external electronic device 90 perform signal transmission based on a communication protocol. Therefore, after the liquid soap replenishing signal is obtained via the control unit 51, the liquid soap replenishing signal is then transmitted to the external electronic device 90 through the communication unit 80. The external electronic device 90 may be a multimedia receiving device, a mobile phone and the like for the operator to obtain the liquid soap replenishing signal intermediately through the external electronic device 90 and then perform the soap replenishing operation.

Compared with the prior art, the present invention is characterized in that the liquid soap 60 can be directly filled on the countertop by directly taking the cover plate 34 on the soap dispensing body 30 down, and the liquid level state of the liquid soap 60 inside the liquid soap container 20 can be distinguished by the liquid soap replenishing light display area composed of the light emitting assembly 35 and the light-transmitting neck portion 322, so as to judge whether to fill the soap or soap filling has been completed. Therefore, a soap dispensing device 10 which has a soap replenishing notification function and can perform a soap filling operation directly on a countertop can be formed.

Furthermore, in the present invention, the pipelines for connecting various components include, but are not limited to the soap filling pipeline 321, the exhaust pipe 373 and the soap discharging pipeline 41, all of which are formed from flexible and bendable pipe bodies. Further, the soap dispensing device 10 of the present invention can be mounted easily and rapidly according to different environment during mounting, and the liquid soap container 20, the soap dispenser 40 and the control box 50 can be mounted at appropriate arrangement positions within a finite space using the support rack 70.

Moreover, in addition that the gas in the liquid soap container 20 is discharged by the gas outlet 372 and the exhaust pipe 373, when the excessive liquid soap 60 is filled in the liquid soap container 20, the excessive liquid soap 60 is discharged via the gas outlet 372, such that the liquid soap 60 can be prevented from overflowing from the periphery of the liquid soap container 20. In addition, the structure of the present invention is simpler than that of the known technology, therefore, the material cost and the assembly cost are greatly reduced, and the market competitiveness of the product is further enhanced.

What is claimed is:

1. A soap dispensing device having a soap replenishing notification function, which is provided on a countertop and automatically dispenses a liquid soap, comprising:
    a liquid soap container, used for containing the liquid soap and internally provided with a liquid level detection unit for detecting a liquid level state of the liquid soap and emitting a liquid soap replenishing signal;
    a soap dispensing body, comprising an outer shell arranged on the countertop, a soap filling pipe provided inside the outer shell and communicated to the liquid soap container, a cover plate that covers and encloses the soap filling pipe, at least one light emitting assembly provided inside the outer shell and capable of emitting light to form a liquid soap replenishing light display area on the outer shell, an induction area provided with an inductor and emitting an induction signal, and a soap dispensing head connected to the outer shell, a light-transmitting neck portion which is annularly provided on the cover plate being provided at a position, close to the cover plate of the soap filling pipe, the light-transmitting neck portion being partially exposed to the outer shell to enable light emitted from the light emitting assembly to form the liquid soap replenishing light display area through the light-transmitting neck portion, the soap dispensing head being provided with at least one soap outlet for supplying the liquid soap and a gas outlet connected to the liquid soap container using an exhaust pipe;
    a soap dispenser, connected to the liquid soap container and comprising a soap discharging pipeline which is connected to the soap outlet to deliver the liquid soap contained in the liquid soap container to the soap outlet; and
    a control box, electrically connected to the liquid level detection unit, the inductor, the light emitting assembly and the soap dispenser respectively to receive the liquid soap replenishing signal and the induction signal emitted under the liquid level state, and impel the light emitting assembly to emit light according to the liquid soap replenishing signal to form the liquid soap replenishing light display area on the soap dispensing body, and control the soap dispenser according to the induction signal such that the liquid soap is provided from the liquid soap container using the soap discharging pipeline to the soap outlet and is dispensed.

2. The soap dispensing device having a soap replenishing notification function according to claim 1, wherein the cover plate further comprises a lock thereon, which can be locked using a key to prevent the soap filling pipe from being opened.

3. The soap dispensing device having a soap replenishing notification function according to claim 1, wherein the liquid soap container further comprises a connection portion through which the soap filling pipe and the exhaust pipe are connected with the liquid soap container.

4. The soap dispensing device having a soap replenishing notification function according to claim 3, wherein the control box is further provided above the liquid soap container, and the connection portion and the soap dispenser are provided at the same side of the liquid soap container.

5. The soap dispensing device having a soap replenishing notification function according to claim 3, wherein the control box is further provided below the liquid soap container, and the connection portion and the soap dispenser are provided at corresponding sides of the liquid soap container.

6. The soap dispensing device having a soap replenishing notification function according to claim 1, wherein the outer shell of the soap dispensing body further comprises a fixed neck portion which is provided on the countertop.

7. The soap dispensing device having a soap replenishing notification function according to claim 6, wherein the soap dispensing body further comprises a locking member which is opposite to and spaced from the fixed neck portion, such that the soap dispensing body is fixed on the countertop using the fixed neck portion and the locking member.

8. The soap dispensing device having a soap replenishing notification function according to claim 7, wherein the locking member is further sleeved outside the soap filling pipe.

9. The soap dispensing device having a soap replenishing notification function according to claim 1, wherein the soap filling pipe is further formed from a light-transmissible material.

10. The soap dispensing device having a soap replenishing notification function according to claim 1, wherein the control box further comprises a control unit connected to the liquid level detection unit, and a communication unit which is linked to the control unit and is capable of transmitting signals with an external electronic device.

11. The soap dispensing device having a soap replenishing notification function according to claim 10, wherein the liquid level detection unit further comprises an upper liquid level detection unit for detecting an upper liquid level of the liquid soap in the liquid soap container and a lower liquid level detection unit for detecting a lower liquid level of the liquid soap in the liquid soap container.

* * * * *